(12) United States Patent
Chene et al.

(10) Patent No.: US 6,663,010 B2
(45) Date of Patent: Dec. 16, 2003

(54) INDIVIDUALIZED VEHICLE SETTINGS

(75) Inventors: George Chene, Sterling Heights, MI (US); Lee A. French, Sterling Heights, MI (US); Dennis A. Kramer, Troy, MI (US); Gerald D. Lawruk, Clarkston, MI (US); Brian Jeffrey Mueller, Lake Orion, MI (US); Reno V. Ramsey, Sterling Heights, MI (US); Wayne Shintaku, Auburn Hills, MI (US); Jack R. Worrall, Novi, MI (US)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 61 days.

(21) Appl. No.: 09/767,930

(22) Filed: Jan. 22, 2001

(65) Prior Publication Data

US 2002/0096572 A1 Jul. 25, 2002

(51) Int. Cl.$^7$ .......................... G05D 23/00; F24F 13/24
(52) U.S. Cl. .......................... 236/51; 62/244; 340/449; 455/346
(58) Field of Search .................. 455/345, 346; 236/51; 340/449; 62/244

(56) References Cited

U.S. PATENT DOCUMENTS

| | | | | |
|---|---|---|---|---|
| 3,877,639 A | * | 4/1975 | Wilson et al. | 236/51 X |
| 4,204,255 A | | 5/1980 | Cremer | 296/65.1 X |
| 4,477,874 A | | 10/1984 | Ikuta et al. | 340/825.31 X |
| 4,660,140 A | | 4/1987 | Illg | 318/568 X |
| 4,707,788 A | | 11/1987 | Tashiro et al. | 296/65.1 X |
| 4,731,769 A | | 3/1988 | Schaefer et al. | 455/345 |
| 5,091,856 A | | 2/1992 | Hasegawa et al. | 180/287 X |
| 5,104,037 A | * | 4/1992 | Karg et al. | 236/46 R |
| 5,239,700 A | * | 8/1993 | Guenther et al. | 455/158.4 |
| 5,272,477 A | * | 12/1993 | Tashima et al. | 236/51 X |
| 5,590,831 A | * | 1/1997 | Manson et al. | 236/51 |
| 5,812,399 A | | 9/1998 | Judic et al. | 318/467 X |
| 5,847,671 A | * | 12/1998 | Sailer et al. | 341/173 |
| 6,006,147 A | | 12/1999 | Hall et al. | 70/29 |

* cited by examiner

Primary Examiner—William Wayner
(74) Attorney, Agent, or Firm—Carlson, Gaskey & Olds

(57) ABSTRACT

A system for setting vehicle operator preferences is provided. The system includes a vehicle control module for controlling a vehicle component such as an HVAC unit. A data link is connected to the vehicle control module and may be an infrared signal receiver, a radio frequency signal receiver, a vehicle communications bus, or any other suitable data link. A portable handheld computing device includes a program having vehicle preferences stored in a memory. Preferably, the vehicle preferences may be input by the operator into the portable handheld computing device. The portable handheld computing device may be a Handspring® device, a Palmpilot® device, or any other suitable portable computing device. The portable handheld computing device sends the vehicle preferences to the vehicle control module through the data link to control the vehicle component. The vehicle preferences are sent by IR, RF, or any other suitable means. The system may be used to control an HVA system, for example. The portable handheld computing device may include a temperature sensor received in an expansion port for sensing the temperature in the area of the portable handheld computing device. The portable handheld computing device may be taken to a sleeping area of a vehicle cab to control the temperature locally when the operator is sleeping.

15 Claims, 1 Drawing Sheet

INDIVIDUALIZED VEHICLE SETTINGS

BACKGROUND OF THE INVENTION

This invention relates to a method and system for providing vehicle settings to the vehicle's control systems, and more particularly, the invention relates to a method and system for individualizing vehicle operator settings.

Operators of heavy duty vehicles such as semi-tractor trailers used in fleets, frequently operate more than one vehicle and share a vehicle with another operator. Each time an operator enters a vehicle the operator adjusts various vehicle settings to suit the operator's preferences. For example, the operator may adjust personal comfort items such as seat position, mirror position, radio station, temperature, and pedal position. The tractors often include a sleeping area for the operator. Climate control for the tractor is located in the passenger area of the tractor and is best suited for climate control in the passenger area, not the sleeping area.

Passenger vehicles have provided methods and systems to accommodate the settings of more than operator. Key fobs, or other devices typically associated with starting the vehicle, may send a signal to the vehicle to reveal the identity of the operator. Various vehicle settings may be adjusted, such as seat position, and linked to an operator identification. However, an operator may not take the key fob or other control device to another vehicle to transfer the operator's vehicle preferences to that other vehicle. Additionally, rather limited control has been available over the many vehicle control systems that may be adjusted by the operator. Therefore, what is needed is a method and system for providing individualized vehicle settings to various vehicles with a single control unit while providing increased operator control of the many vehicle control systems.

SUMMARY OF THE INVENTION AND ADVANTAGES

The present invention provides a system for setting vehicle operator preferences. The system includes a vehicle control module for controlling a vehicle component such as an HVAC unit. A data link is connected to the vehicle control module and may be an infrared (IR) signal receiver, a radio frequency (RF) signal receiver, a vehicle communications bus, or any other suitable data link. A portable handheld computing device or PDA includes a program having vehicle preferences stored in a memory. Preferably, the vehicle preferences may be input by the operator into the PDA. The portable handheld computing device may be a Handspring® device, a Palmpilot® device, or any other suitable portable computing device. The PDA sends the vehicle preferences to the vehicle control module through the data link to control the vehicle component. The vehicle preferences are sent by IR, RF, or any other suitable means.

The system may be used to control an HVA system, for example. The portable handheld computing device may include a temperature sensor received in an expansion port of the PDA for sensing the temperature in the area of the portable handheld computing device. The PDA may be taken to a sleeping area of a vehicle cab to control the temperature locally when the operator is sleeping.

Accordingly, the above method and system provides individualized vehicle settings to various vehicles with a single control unit while providing increased operator control of the many vehicle control systems.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
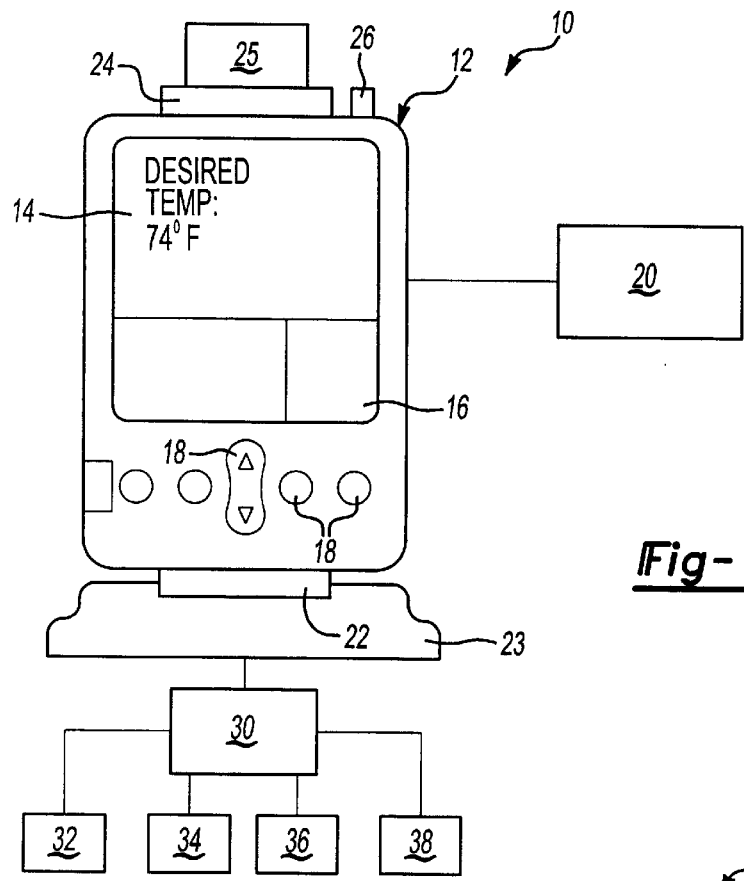
FIG. 1 is a schematic view of a system for setting vehicle operator preferences.

A control system 10 for setting and controlling vehicle operator preferences is shown schematically in FIG. 1. The control system 10 includes a portable handheld computing device or personal digital assistant (PDA) 12, such as a Handspring® device, a Palmpilot® device, or any other suitable portable handheld computing device. The PDA 12 includes a display screen 14, which is also commonly a touch screen for receiving pressure inputs. The PDA 12 may also include a character input screen 16 for inputting alphanumeric characters with a stylus. Buttons 18 may also be used to input data into the PDA 12.

A program 20 residing in the memory of the PDA 12 and includes vehicle preferences that may be input by the operator using the character input screen 16, the buttons 18, or some other input device. Alternatively, the vehicle preferences may be input elsewhere and then downloaded to the PDA 12. The program 20 contains vehicle preferences for such devices as the seat, mirror, radio, HVAC. Additionally, the program 20 may contain vehicle preferences for vehicle performance settings, which are typically controlled by the operator, such as shift settings, engine performance parameters, pedal position, and handling settings for the vehicle steering and suspension.

The PDA 12 preferably includes a data port 22 for electrical connection to another device to send and receive data. The PDA 12 may be installed into a cradle 23 to connect the data port 22 to another device. PDAs often incorporate expansion ports 24 for inserting accessories 25 such as cell phone units or extended memory. PDAs also commonly incorporate infrared transmitters 26 for sending data from the PDA 12 to another device having an infrared receiver.

Vehicles commonly include a vehicle communications bus 30, such as a J1708 or J1939 or J1850 type databus to permit communication with the vehicle's control modules. The vehicle communication bus 30 is connected to an accessory control module 32 for controlling accessories such as the radio, seat, HVAC unit, mirror, or other personal comfort items commonly found in a vehicle. An engine control module 34 is connected to the vehicle communications bus 30 and controls engine performance parameters. A transmission control module 36 is also connected to the vehicle communications bus 30 for controlling such transmission parameters as shift settings. Vehicle ride characteristics such as suspension stiffness may be controlled by a steering and suspension control module 38, which is also connected to the vehicle communications bus 30. It is to be understood, however, that within the scope of this invention the control modules may be integrated with one another or independent of one another. The PDA 12 may be assigned to a particular operator in a fleet and then be taken to different vehicles in the fleet. The operator may the connect the PDA 12 to the vehicle communications bus 30 or some other data link to download his individualized vehicle preferences at the beginning of his shift.

In operation, individualized vehicle preferences are input into the PDA 12. The vehicle preferences are stored in a program and may also be displayed on the displaying screen 14 for viewing by the operator. The vehicle preferences may be adjusted using conventional controls such as switches or dials or with the present invention by modifying the values using the character input 16 and buttons 18. The PDA 12 is then connected to the vehicle control module through a data link so that the vehicle preferences from the PDA may be transferred to a vehicle control module. The data link may be a hardwire connection between the data port 22 and cradle 23 or a wireless connection, such as an infrared frequency signal or a radio frequency signal. Vehicle preferences are then broadcast to the vehicle control modules through the data link. The vehicle control modules execute the vehicle preferences by controlling the associated vehicle components.

Figure 2:
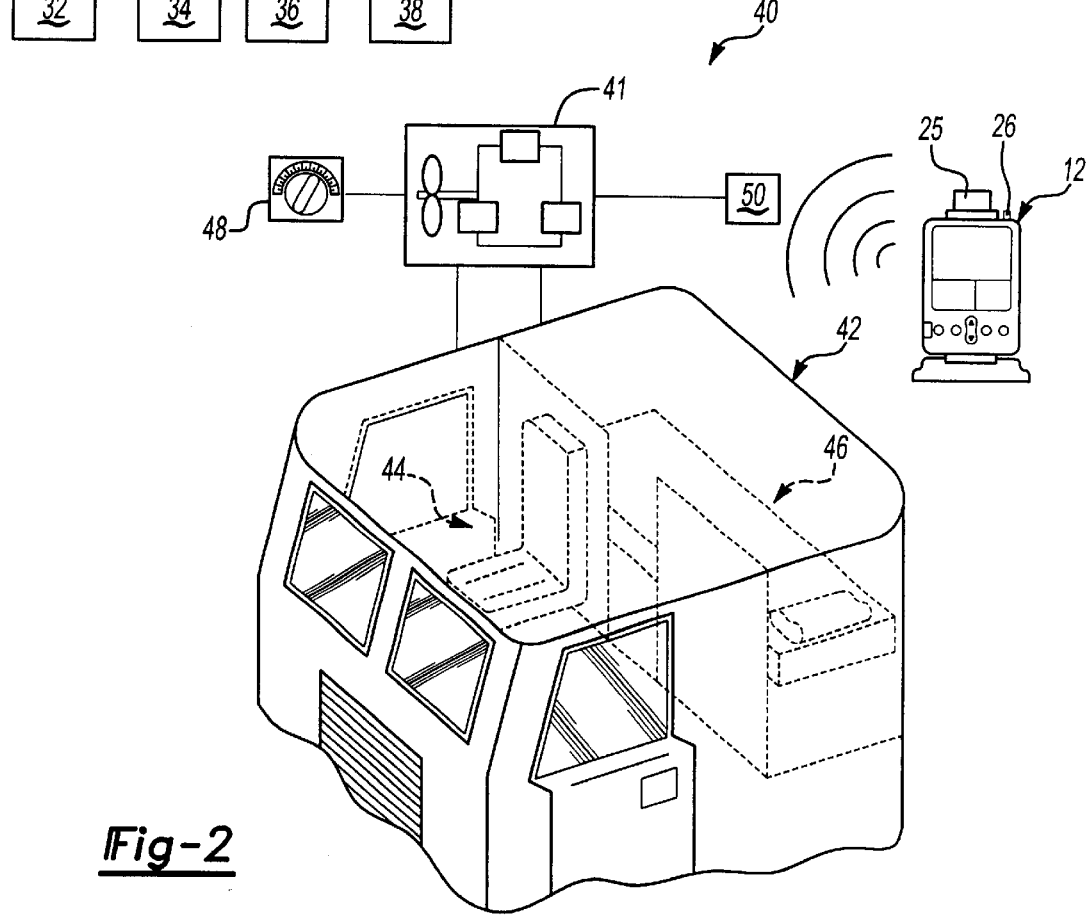
FIG. 2 is a schematic view of the system shown in FIG. 1 used for setting the vehicle operator preferences for a HVAC system.

One example of the present invention is shown schematically in FIG. 2. A heavy duty tractor includes a vehicle cab 42 having a passenger area 44 and a sleeping are 46. An HVAC system 40 having an HVAC unit 41 controls the climate of the vehicle cab 42. Typically, a manual control switch 48 has been used to control the climate of the entire vehicle cab 42, including sleeping area 46, which provides inadequate climate control in that area. The PDA 12 may include a temperature sensor 25 installed in the expansion port 24 for sensing the temperature in the area of the PDA 12. The temperature is broadcast to the portion of the HVAC system, such as a receiver 50. The PDA 12 may then be taken by the operator to the sleeping area 46 or any other portion of the vehicle cab 42 to better control of the climate in the area of the PDA and thus near the operator. The operator may set the desired temperature in the PDA 12, which would then be transmitted to a data link such as an infrared receiver SO. The HVAC unit 41 may then better control the climate in the area of the sleeping area 46.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A method of setting vehicle operator preferences comprising the steps of
   a) storing a program having vehicle preferences on a portable handheld computing device;
   b) connecting the portable handheld computing device to a vehicle control module, including electrically connecting the portable handheld computing device to a vehicle communications bus,
   c) broadcasting the vehicle preferences to the vehicle control module; and
   d) obtaining the vehicle preferences with the vehicle control module.

2. The method according to claim 1, wherein step b) includes transmitting an infrared frequency signal from the portable handheld computing device to a receiver.

3. The method according to claim 1, wherein step b) includes transmitting an radio frequency signal from the portable handheld computing device to a receiver.

4. The method according to claim 1, further including step e) inputting individualized vehicle preferences into the portable handheld computing device.

5. The method according to claim 1, wherein step b) includes installing the portable handheld computing device into a cradle.

6. The method according to claim 1, wherein the vehicle control module is a portion of a HVAC system.

7. A method of setting vehicle operator preferences comprising the steps of:
   a) storing a program having vehicle preferences on a portable handheld computing device;
   b) connecting the portable handheld computing device to a vehicle control module;
   c) providing a temperature sensor for sensing a temperature in an area about the portable handheld computing device;
   d) broadcasting the vehicle preferences to the vehicle control module including broadcasting the temperature to the portion of the HVAC system; and
   e) obtaining the vehicle preferences with the vehicle control module.

8. The method according to claim 7, wherein the vehicle preferences of step a) include a desired temperature, step c) includes broadcasting the desired temperature to the portion of the HVAC system, and step d) obtains the temperature in a sleeper area of a vehicle cab.

9. A system for setting vehicle operator preferences comprising:
   a vehicle control module controlling a vehicle component;
   a data link connected to said vehicle control module, said data link includes a vehicle communications bus; and
   portable handheld computing device including a program having preferences to said vehicle control module through said data link to control sand vehicle component.

10. A system for setting vehicle operator preferences comprising:
    a vehicle control module controlling a vehicle component;
    a data link connected to said vehicle control module; and
    a portable handheld computing device including a program having vehicle preferences stored in a memory, said portable handheld computing device sending said vehicle preferences to said vehicle control module through said data link to control said vehicle component; and a cradle electrically connected to said data link with said portable hand held computing device being received in said cradle.

11. The system according to claim 10, wherein said data link includes an infrared signal receiver, and said portable handheld computing device includes an infrared signal transmitter for sending said vehicle preferences to said vehicle control module.

12. The system according to claim 10, wherein said data link includes a radio frequency signal receiver, and wherein said portable handheld computing device includes a radio frequency signal transmitter for sending said vehicle preferences to said vehicle control module.

13. The system according to claim 10, wherein said vehicle control module is a portion of an HVAC system.

14. The system according to claim 10, wherein said portable handheld computing device includes an input device for iinputting individulized vehicle preferences into said portable handheld computing device.

15. A system for setting vehicle operator preferences comprising:
- a vehicle control module controlling a vehicle component;
- data link connected to said vehicle control module;
- a portable handheld computing device including a program having vehicle preferences stored in a memory, said portable handheld computing device ending said vehicle preferences to said vehicle control module through said data link to control said vehicle component; and
- a temperature sensor for sealing a temperature in an area about said portable handheld computing device, said temperature is located in a sleeper area of a vehicle cab.

* * * * *

UNITED STATES PATENT AND TRADEMARK OFFICE
CERTIFICATE OF CORRECTION

PATENT NO. : 6,663,010 B2  Page 1 of 1
DATED : December 16, 2003
INVENTOR(S) : Chene et al.

It is certified that error appears in the above-identified patent and that said Letters Patent is hereby corrected as shown below:

Column 4,
Line 40, should read as follows:
-- A system for setting vehicle operator preferences comprising:
    a vehicle control module controlling a vehicle component;
    a data link connected to said vehicle control module;
    a portable handheld computing device including a program having vehicle preferences stored in a memory, said portable handheld computing device sending said vehicle preferences to said vehicle control module through said data link to control said vehicle component; and
    a cradle electrically connected to said data link with said portable hand held computing device being received in said cradle. --

Line 66, "iinputting" should be -- inputting --

Column 5,
Line 7, "ending" should be -- sending --

Column 6,
Line 4, "sealing" should be -- sensing --

Signed and Sealed this

Fourth Day of May, 2004

JON W. DUDAS
*Acting Director of the United States Patent and Trademark Office*